March 11, 1958  R. J. KOUPAL  2,826,308
FILTER ELEMENT
Filed Oct. 3, 1955
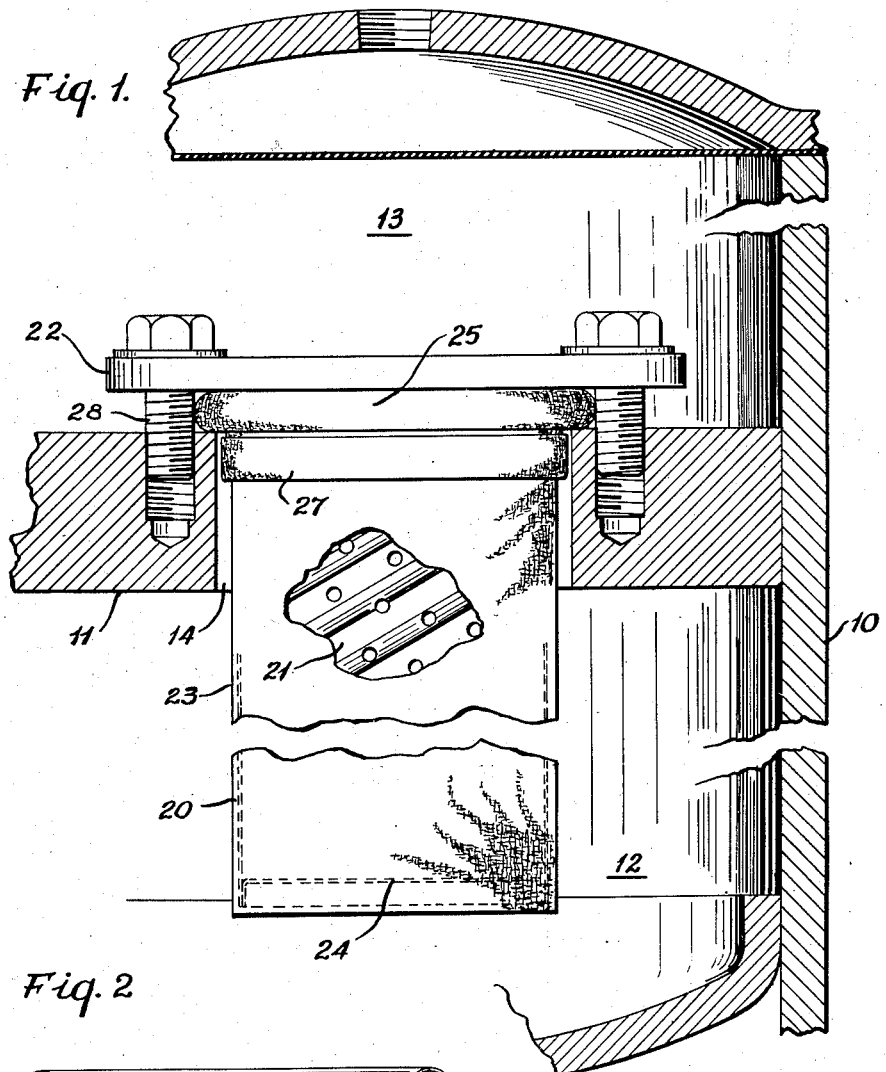

United States Patent Office 2,826,308
Patented Mar. 11, 1958

2,826,308
FILTER ELEMENT

Robert J. Koupal, Tucson, Ariz., assignor to Infilco Incorporated, Tucson, Ariz., a corporation of Delaware Application October 3, 1955, Serial No. 538,136

4 Claims. (Cl. 210—457)

This invention relates to filters of the type wherein a bed or coat of filter-aid material, such as diatomaceous earth, is deposited on some kind of permeable support or element. Such filters are known in the art, and, therefore, sometimes referred to herein, as "diatomite filters." It should, however, be understood that the term "diatomite filter" is used herein in a generic sense without limitation to any particular filter construction or filter-aid material.

The invention relates to an improved element for a diatomite filter, and particularly to an element of the type including a fabric bag drawn over and cooperating with a rigid permeable support or core.

It is an object of this invention to provide an improved diatomite filter element.

Another object is to provide a simplified and more economical construction for a diatomite filter element.

Another object is to provide improved means for preventing longitudinal displacement of a fabric filter bag relative to its core.

Another object is to provide a fabric bag for a diatomite filter element, whose upper portion is used as a gasket.

Another object is to provide an element having a bag with an upper portion serving the double function of a gasket between the element and the filter partition and a means for holding the bag in place.

Other objects will become apparent upon consideration of the detailed description and of the claims which follow.

A diatomite filter element ordinarily comprises a rigid, permeable core which may serve as the filter element proper or as a foundation for various types of supporting surfaces for the coat of filter-aid material, such as, for example, a wire helically wound about the core, or a fabric bag drawn thereover. The present invention relates to an element utilizing a fabric bag as the filter-aid supporting surface.

One or more elements are supported in a shell or casing in such manner that the liquid to be filtered, entering the casing, can reach the casing outlet only by passing through the filter elements. Usually the elements are supported from a partition or plate extending across the casing and dividing the casing into an inlet chamber for liquid to be filtered on its one side and a filtered liquid outlet chamber on its other side, and provided with ports. The elements extend into the inlet chamber and register with the ports.

To prevent leakage of unfiltered liquid from the inlet chamber to the filtered liquid outlet chamber sealing means must be provided between the elements and the plate. These sealing means ordinarily involve the use of flat gaskets, or O-ring gaskets with retainer rings, sealing compounds, and the like.

Preventing leakage in this manner is efficient, but has the disadvantage of adding to the first cost and spare parts inventories incident to filters using such sealing means.

When filter elements employing fabric bags for the filter-aid supporting surface are backwashed, the bags balloon out under the backwash pressure, and the filter-aid coat, as well as the impurities retained thereby, are broken up and washed away by the backwash liquid passing through the elements in the reverse direction. Incidental to this ballooning out due to the reversal of flow through the elements is a tendency of the bags to be displaced along the longitudinal axes of the element cores. Such longitudinal displacement of the bags has been prevented in prior art elements by tightly clamping or tying the upper end of the bags to the element cores.

Preventing longitudinal displacement in this manner is efficient, but in practice some drawbacks have been experienced. Thus, where corrosive liquids are filtered, the clamping or tying means must be of corrosion resistant material, which adds to the cost of the filter elements.

The invention is particularly useful in preventing both displacement of the fabric bag relative to its core and leakage of unfiltered liquid between the elements and the element supporting plate from the inlet chamber into the filtered liquid outlet chamber.

My invention permits elimination of customary clamping means and separate sealing means.

The invention will be more readily understood from consideration of the drawings which form a part hereof, and wherein similar elements in the several figures are designated by similar reference characters.

Figure 1 is a partial vertical cross-sectional view of a diatomite filter showing an element according to the invention in elevation and partly broken away; and Figure 2 is a vertical cross-sectional view of a detail of the element of Figure 1.

The filter shown in Figure 1 comprises a shell or casing 10, which is divided by a plate or partition 11 into an inlet chamber 12 and an outlet chamber 13.

The plate 11 extends across the casing 10 and is provided with a port 14, through which a filter element 20 extends. Obviously several ports 14 can, and usually will, be provided to accommodate a plurality of elements 20.

The filter element 20 comprises a permeable, rigid, hollow core 21, provided with a flange 22 of greater diameter than the port 14, and a fabric bag 23. In a preferred form of the invention the core 21 is an open-ended perforated tube impressed with spiral corrugations which develop structural strength to withstand high differential pressures and is closed at one end by a cap 24. The other end of the core is surrounded by the flange 22, which may be integral with the core. Any suitable material, such as a resilient natural or synthetic fiber fabric, can be used for the bag. The bag 23 has a closed end and an open end and conforms in shape substantially to the core, but should be somewhat larger than the core, so that it will fit loosely over it.

During filtering the inlet pressure holds the bag 23 tightly to the surface of the core 21 over and around the corrugations. When the filter run is stopped and the pressure differential between the inlet and outlet chambers becomes zero, the bag, due to the resiliency of its fabric, resumes its original shape, and upon application of backwash fluid balloons out.

The open end of the bag 23 is provided on its outside with a roll 25 of sufficient thickness to extend well beyond the periphery of the port. The roll 25 may be formed simply by rolling a portion of the bag down over itself or over a cord for about two folds. In a preferred embodiment, which is best shown in Figure 2, it may consist of a fabric cord 26 sewn inside a double thickness of fabric 27 with the double thickness of fabric 27 then sewn around the outside of the open end of the bag 23. The cord 26 may be made of plastic-coated strands of synthetic fiber.

To assemble the element the bag 23 simply is drawn over the core 21 until the roll 25 contacts the underside of the flange 22. The element 20, so assembled, is inserted through the port 14 so as to extend into the inlet chamber 12, but its upper flanged end and the roll 25, being wider than the port, remain in the outlet chamber 13, where the flange is secured to the plate 11 with cap screws 28, as shown, with the roll 25 between the two. The screws 28 are tightened until the roll 25 is compressed between the flange 22 and the plate 11. In its compressed state, roll 25 prevents leakage of fluid between plate 11 and flange 22 and also holds the bag 23 against longitudinal displacement along core 21.

The new filter element construction has several important advantages. By making the roll 25 an integral part of the fabric bag, separate gasketing, customarily used with filter elements, is eliminated. This has the further advantage that a separate inventory of gaskets need not be maintained.

The new construction also permits eliminating the clamps which have customarily been used for securing the fabric bags to the element cores, the roll portion serving also the function of securing the bag. Again, a separate inventory of clamps is unnecessary.

These new features result in a filter element which can very readily be installed in a filter by merely drawing the bag 23 over the core 21 and inserting the parts so assembled through the port 14, and tightening cap screws 28. Conversely, when it is necessary to remove the element for inspection, repair, or replacement, the element can be lifted from the casing 10 as a unit by simply removing the cap screws 28 from the plate 11 without the necessity of removing clamps.

It will be seen that the invention lends itself readily to filter elements of widely varying dimensions and simplifies the construction of prior art filter elements of this type.

It will be obvious to those skilled in the art that many modifications of the embodiment shown in the drawings, and described for purposes of exemplification and illustration, can be made without departing from the spirit and scope of the invention. For example, instead of using a cord, a resilient plastic ring could be sewn into the double thickness of fabric forming the roll. Accordingly, it should be understood that the invention is not limited to the exact details of the embodiment shown in the drawings.

I claim:

1. A filter element for a diatomite filter including a casing, and a partition across said casing separating therein an inlet chamber from an outlet chamber and having a port, said filter element comprising a rigid, hollow, pervious core with a closed end and an open end having a surrounding flange of greater diameter than said port, said element being supported by said partition and extending through said port into said inlet chamber with said flange in said outlet chamber affixed to said partition, and a fabric bag drawn over said core and having a closed end and an open end, characterized by a rolled fabric portion at the open end of said bag, said rolled fabric portion being interposed between said flange and said partition, and means for compressing said rolled fabric portion between said flange and said partition, said rolled fabric portion when so interposed and compressed serving the double function of holding said bag in place against longitudinal movement on said core and of preventing leakage of fluid between said element and said partition.

2. A filter element according to claim 1, wherein said fabric portion at the open end of said bag is rolled about a cord.

3. In a filter element for a diatomite filter of the type including a casing, and a plate across said casing separating therein an inlet chamber from an outlet chamber and having a port through which a filter element extends into the inlet chamber, said element comprising a rigid, hollow, pervious core with a closed end and an open end having a surrounding flange of larger diameter than said port, and a fabric bag drawn over said core and having a closed end and an open end, the combination with said fabric bag of a fabric cord sewn inside a double thickness of fabric and fastened around the outside of the open end of said bag in a manner to form a roll of sufficient thickness to extend, when installed, beyond the periphery of said port and to be interposed between said flange and said plate, and means for securing said flange to said plate and compressing said roll.

4. A filter element according to claim 3, wherein said fabric cord comprises strands of plastic-coated synthetic fiber and said double thickness of fabric is sewn to the outside of the open end of said bag.

References Cited in the file of this patent

UNITED STATES PATENTS

| | | |
|---|---|---|
| 733,542 | Converse | July 14, 1903 |
| 872,437 | Leonard | Dec. 3, 1907 |
| 1,782,531 | Fokker | Nov. 25, 1930 |
| 2,117,361 | Rohrbach | May 17, 1938 |
| 2,654,482 | Robinson | Oct. 6, 1953 |